(12) United States Patent
Noehl et al.

(10) Patent No.: US 8,590,685 B2
(45) Date of Patent: Nov. 26, 2013

(54) DUAL CLUTCH

(75) Inventors: Oliver Noehl, Buehlertal (DE); Ivo Agner, Buehl (DE); Norbert Radinger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 349 days.

(21) Appl. No.: 13/003,909

(22) PCT Filed: Jun. 29, 2009

(86) PCT No.: PCT/DE2009/000903
§ 371 (c)(1),
(2), (4) Date: Jan. 13, 2011

(87) PCT Pub. No.: WO2010/006580
PCT Pub. Date: Jan. 21, 2010

(65) Prior Publication Data
US 2011/0114436 A1  May 19, 2011

(30) Foreign Application Priority Data

Jul. 14, 2008 (DE) .......................... 10 2008 033 035

(51) Int. Cl.
*F16D 21/06* (2006.01)
*F16D 25/08* (2006.01)
*F16D 25/10* (2006.01)

(52) U.S. Cl.
USPC ................... 192/48.606; 192/48.8; 192/85.53

(58) Field of Classification Search
USPC ......... 192/48.8, 48.91, 48.606, 48.607, 85.53
See application file for complete search history.

(56) References Cited

U.S. PATENT DOCUMENTS

| 2,700,341 | A | * | 1/1955 | Smirl | 418/25 |
| 4,809,833 | A | * | 3/1989 | Brunken et al. | 192/58.4 |
| 2003/0075412 | A1 | * | 4/2003 | Heiartz et al. | 192/20 |
| 2005/0205376 | A1 | | 9/2005 | Kemper | |
| 2006/0163019 | A1 | * | 7/2006 | Feldhaus et al. | 192/48.8 |

FOREIGN PATENT DOCUMENTS

| DE | 101 49 702 A1 | 4/2003 |
| DE | 10 2006 057 482 A1 | 6/2008 |
| FR | 2 082 870 A | 12/1971 |

* cited by examiner

*Primary Examiner* — Richard M. Lorence
*Assistant Examiner* — Lillian Nguyen
(74) *Attorney, Agent, or Firm* — Lucas & Mercanti, LLP (57) ABSTRACT

A dual clutch which has two friction clutches, which have a central pressure-exerting plate and two pressure plates which are axially movable relative to the pressure-exerting plate with the interposition of the friction linings of two clutch disks, which each mesh with a gearbox input shaft of actuating devices. The pressure plates are acted on by transmission elements by the actuating devices directly without a lever action. Furthermore, for the cooling and lubrication of the actuating bearings between the actuating devices and the transmission elements, an annular chamber can be formed which has an increased fluid volume.

34 Claims, 7 Drawing Sheets

DUAL CLUTCH

This application is a 371 of PCT/DE2009/000903 filed Jun. 29, 2009, which in turn claims the priority of DE 10 2008 033 035.3 filed Jul. 14, 2008, the priority of both applications is hereby claimed and both applications are incorporated by reference herein.

The invention relates to a dual clutch with two frictional clutches driven by a drive unit, with a common clutch housing and a contact pressure plate with two contact pressure surfaces fixedly connected to the clutch housing, and with two axially displaceable pressure plates which each face one of the contact pressure surfaces.

Dual clutches with two frictional clutches, with a clutch housing and a central contact pressure plate fixedly connected to the clutch housing are known. In this connection, the pressure plates are axially displaced by actuating devices by actuating radially inwardly an axially directed plate spring or lever elements with a predetermined disconnecting distance. Depending on the configuration of the corresponding frictional clutch, the plate spring or lever elements are supported as a frictional clutch which is forcibly pressed or pulled closed, i.e. is forcibly closed, or as frictional clutches which are forcibly pressed open i.e., forcibly opened as a one-armed or two-armed lever at the clutch housing with the formation of a gear ratio, so that the axial path of the actuating device is longer than the path of the pressure plate from the completely closed state of the frictional clutch, in which no torque is transmitted, to the completely open state in which the maximum torque is transmitted. In particular in narrow structural spaces, the actuating devices must be adapted to this elongated actuating path.

Furthermore, the exact assignment of an axial path of the actuating device to a path of the pressure plate and, thus, an assignment of the torque transmitted by the frictional clutch depends on the elastic properties, particularly the tolerances thereof, for example, the manufacturing tolerances and deviations over the service life. As a result, the axial paths contingent on these tolerances also increase because the axial paths must be dimensioned to the greatest deviation. Furthermore, the assignment of an axial path to the actual path of the pressure plate decreases or exhibits a hysteresis.

Therefore, a dual clutch proposed with two frictional clutches, driven by a drive unit with a common clutch housing and a contact pressure plate fixedly connected to the clutch housing with two contact pressure surfaces as well as two axially displaceable pressure plates each facing a contact pressure surface, wherein, between one pressure plate each and the contact pressure plate, frictional linings can be tensioned with a clutch disk non-rotationally connected to a gear unit input shaft of a gear unit for forming a frictional engagement by the pressure plates being axially acted upon by means of an actuating device each, and the pressure plates are actuated by means of transfer elements acted upon by the actuating devices and the pressure plates are displaced by the same actuating path as it is adjusted at the actuating devices.

This means that the transfer elements are not bearing as levers on the clutch housing, but, in a displacement in a direction extending essentially perpendicularly to the axis of rotation of the dual clutch transform the axial path imparted to the actuating devices into a path of the pressure plate which conforms with respect to dimension and direction. In this connection, the transfer elements are preferably constructed as disk-shaped stiff piston plates which at their inner circumference are acted upon by the actuating devices and radially outwardly displace the pressure plate.

Due to the direct actuation of the pressure plates without a lever transmission of the transfer elements, the actuating bearings arranged between the actuating devices and the transfer elements are subjected to high loads. Consequently, a high frictional heat develops particularly when a high number of clutching procedures are carried out, for example, in city driving in the actuating bearings which is difficult to discharge particularly in the case of actuating bearings which are filled with grease and are encapsulated.

Therefore, it is the object of the invention to propose a dual clutch, the actuating bearings or which are lubricated in an improved manner and which can be cooled, if necessary.

The invention meets the above object by a dual clutch having two frictional clutches driven by a drive unit having a common clutch housing and a contact pressure plate connected fixedly to the clutch housing, with two contact pressure surfaces and two pressure plates which are axially displaceable and each facing a contact pressure surface, wherein between respectively one pressure plate and the contact pressure plate frictional linings can be tensioned with a clutch disk which is rotatably fixedly connected to a gear unit input shaft of a gear unit for forming a frictional engagement by the pressure plates being axially acted upon by means of an a actuating device each, which devices are axially fixedly and, via a support bearing rotatably received on the clutch housing, wherein the pressure plates are actuated by means of transfer elements acted upon by the actuating devices, wherein the pressure plates are displaced by the same actuating path as the actuating path adjusted at the actuating devices, and between an outer ring of the support bearing and an inner circumference of the actuating device is formed a sealed annular space. For this purpose, the annular space which is outwardly sealed and is provided between the transfer elements and the actuating bearings is formed in such a way that it surrounds the actuating bearing at least on one side. In this connection, the annular space is at least partially filled with a fluid, so that the cooling volume of the actuating bearings increases. The fluid may have lubricating and/or cooling properties depending on the requirements.

Serving as drive unit may be, for example, an internal combustion engine with a crank shaft and/or an electric machine with a drive shaft. In combination, a hybrid drive may be provided in which alternatively or supplementing each other at least one internal combustion engine and at least one electric machine form the drive unit.

The two frictional clutches are preferably dry single-disc clutches with respectively a metal frictional surface each at the contact pressure plate and at the pressure plates, as well as clutch disks with frictional linings forming counter frictional surfaces. The frictional linings of the clutch disks are preferably equipped with a lining resilience; in addition, the pressure plates are closed axially displaceably, against the effect of energy storage units, such as, for example, plate springs, so that during opening of a frictional clutch the corresponding pressure plate is displaced in the opening direction.

At least one of the two frictional clutches is constructed so as to be self-opening. This means that when the load is removed from the actuating device, the frictional clutch is transferred from the closed state into the open state. Preferably, both frictional clutches are constructed so as to be forcibly closed, i.e., as frictional clutches that are pressed closed or pulled closed by the respective actuating device, so that both frictional clutches are self-opening as soon as an actuating device is no longer operating, for example, due to a defect.

The two actuating devices can be arranged by means of a common receiving means around the two gear units input shafts. In this connection, it has been found advantageous if the receiving means is rotatably received on the clutch housing and is non-rotatably supported on a gear unit housing of the gear unit. As a result, it is possible to propose a receiving means of the actuating devices which are fixedly mounted on the housing, wherein the supporting force is conducted into the clutch housing, on that the dual clutch forms a self-contained force cycle of the contact forces and counter forces for displacing the pressure plate and for forming the frictional engagement for transmitting the torque from the clutch housing to the clutch disks. In this respect, the dual clutch is independent of tolerance variations, for example, an offset of crankshaft and gear unit input shafts. As a result, the axial paths can be exactly dimensioned and vibrations as well as other influences, which result from a mounting of the actuating devices on the gear unit housing, for example, the entry of gear vibrations or axial vibrations of the internal combustion engine, which lead to pumping between the dual clutch and the actuating devices which are fixedly mounted on the gear unit, can be avoided.

Moreover, it has been found to be advantageous if the clutch housing is rotatably supported on the gear unit housing. For this purpose, the clutch housing can have an axial projection facing the gear unit on which the receiving means is received and by means of which the dual clutch is rotatably supported on the gear unit housing. Such a projection occurs preferably radially inside, for example, on the radial level of the actuating devices, wherein the clutch housing is axially rigidly received by way of a radial bearing on a projection axially projecting out of the gear unit housing. For compensating for axial vibration of the gear side relative to the drive side, the dual clutch can be limited axially, preferably against the action of an axially acting energy storage directly at the crank shaft or with the intermediate arrangement of a rotational vibration damper, for example, a two-mass flywheel, in a non-rotational manner, for example, by means of a plug-type toothing.

By supporting the dual clutch on the gear unit housing, a support of the dual clutch on one of the two gear unit input shafts is avoided, so that these shafts are not subjected to a bending load by the dual clutch and do not require a separate configuration as a result. Moreover, this has the effect that no vibrations, for example, tumbling vibrations, are transmitted from the gear unit into the dual clutch, nor from the dual clutch into the gear unit in this way. The gear unit may be a gear unit with a principal output and an auxiliary output. However, in a preferred manner, the dual clutch is used for a dual clutch gear unit with two partial drive trains for forming a power shift gear unit in which one partial drive train, with the gear unit in gear, transmits torque from the drive unit with the frictional clutch being closed onto the wheels of a motor vehicle and in the other drive train, with the frictional clutch being open, a subsequent gear is engaged, or after the gear is engaged, is being made available in the engaged state. Shifting takes place by overlapping of the two frictional clutches of the dual clutch, wherein the closed frictional clutch is slippingly opened and the open frictional clutch is slippingly closed, so that during the overlapping over the two partial drive trains, varying/alternating partial torques are transmitted.

It has been found to be advantageous if both frictional clutches are forcibly closed frictional clutches in order to avoid blocking of the dual clutch gear unit when an actuating device is failing, particularly during an overlapping shifting position. Due to the advantageous arrangement of a central contact pressure plate with oppositely arranged pressure plates of the frictional clutch, the actuating distances for closing the frictional clutches are arranged opposite each other.

Due to the reception of the dual clutch on the gear unit housing and elimination of the bearing of the dual clutch on one of the coaxially arranged gear unit input shafts, the actuating device arranged between the crankshaft and the central contact pressure plate may be guided, arranged or supplied. This means that, unhindered by a mounting of the dual clutch in the space between gear unit input shafts and the elements arranged radially outside forming the frictional engagement like pressure plates and contact pressure as well as axially between the clutch disks and the gear unit housing, a continuous installation space can be provided for receiving the two actuating devices, preferably in one receptacle. In an advantageous manner, the clutch disk adjacent to the receptacle may be held axially space apart from the frictional linings on the gear unit input shaft associated, which is designed as a hollow shaft, such that the installation space can be additionally enhanced.

The actuating devices may be mechanical lever devices which are driven radially from the outside, for example, by an electric motor. Particularly advantageous is a pneumatic or preferably a hydrostatic actuation of the dual clutch, wherein the joint reception of the actuating devices is configured as a slave cylinder housing in which, in order to pressurize one transfer element each, a slave cylinder is accommodated to which pressure is applied from the outside. The slave cylinders have for this purpose each an annular piston which is axially displaceable in a pressure chamber to which pressure can be applied axially from the outside and actuates, under interconnection of an actuating bearing, the transfer elements.

The pressure chambers of the slave cylinders are, for instance each pressurized a master cylinder which is controlled by a control device by means of an electric motor, or by a pump, possibly with the additional contribution of a pressure reservoir, wherein the pump may be operated by the drive unit or by an electric motor. In an advantageous manner, a so-called power pack can be used which switches several pressure cycles through a central pump and corresponding valves, wherein both frictional clutches are actuated and the switching of the gear unit and the circular lubrication of the annular space can take place.

The annular space is constructed in an advantageous manner in such a way that a seal can be effected in a simple manner between the clutch housing which rotates during operation and the stationary slave cylinder housing which is rotatably received on the clutch housing by means of the support bearing. It has been found advantageous in this connection to receive the support bearing as well as the actuating bearings, or the rolling surfaces thereof, in this annular space.

For this purpose, in an advantageous embodiment, the annular space may be sealed between the clutch housing or a structural component connected thereto and the outer circumference of the annular piston by means of a seal each which compensates for the stroke of the annular piston relative to the axially stationary clutch housing, for example, by means of a radial shaft sealing ring. In this connection, the annular space may be sealed on the side of the clutch housing at an outer ring of the support bearing, so that a structural unit can be formed with the slave cylinder housing containing the annular pistons and the actuating bearings and the support bearing which structural unit already completely includes an annular space containing the appropriate lubricant, such as oil or grease, and which can be mounted as a whole during the assembly of the dual clutch.

In this connection, the radially outer bearing rings of the actuating bearings can be sealed relative to the stationary annular pistons by means of a radial shaft sealing ring, wherein at these bearing rings are provided at the inner circumference thereof appropriate axial sleeve-shaped projections which engage over the annular pistons radially inwardly and wherein preferably the radial shaft sealing ring is axially fixedly arranged on the annular piston which seals on a sealing surface of the outer rings.

In addition to this rotary seal, the bearing rings of the actuating bearings can be sealed relative to an outer ring of the support bearing by means of a translatory seal, so that the sealing task of a rotary and axially sliding seal can be advantageously shared between the rotating clutch housing and the transfer elements rotating with and displaceable axially relative to the clutch housing into an axially stationary, relatively rotating and non-rotating axially displacing seal.

For this purpose, in an advantageous embodiment, an axial annular flange may each be formed on the bearing rings of the actuating bearing so as to be coaxially formed with respect to an annular flange of the bearing ring of the support bearing, and a translatory seal may be effected between the annular flanges of one bearing ring of an actuating bearing each and one of the annular flanges of the bearing ring of the support bearing each. These annular flanges may be arranged radially inwardly within the rolling bodies of the support bearing. The translatory seal may be formed of a sealing lip which can be fixedly arranged on an annular flange, for example the outer ring of the annular flange assigned to the support bearing, and may seal relative to a sealing surface at the corresponding annular flange.

In another embodiment, it may be provided that the bearing rings of the actuating bearing form radially outwardly of the rolling bodies of the support bearing the translatory seal relative to the bearing ring of the support bearing by arranging a sealing lip, for example, at the outer circumference of the bearing rings, which seals relative to an inner circumference of the bearing ring.

In another embodiment, it may be provided that between the clutch housing or the bearing ring of the support bearing and the bearing rings of the actuating bearings an elastic diaphragm each is arranged. Such an elastic diaphragm can be manufactured of plastic or rubber material and may form a fold bellows, a rolling diaphragm or a pendulum bellows. In this case, in an advantageous manner, at least on one side, preferably on both sides of the support bearing an elastic diaphragm is received at an outer circumference of the support bearing and respectively at one inner circumference of the bearing ring of the respective actuating bearing. For stabilizing the connection between the bearing rings and the diaphragm, the diaphragm can be tensioned so as to engage around the bearing rings with a recess or braced between the bearing rings and another component of the bearing.

In accordance with another advantageous embodiment, one or both, and, in a preferred embodiment the slave cylinder facing the drive unit, can have an annular piston rotating with the clutch housing, wherein the actuating bearing is arranged between a grooved ring seal for sealing the pressure chamber of the slave cylinder relative to the slave cylinder housing and the annular piston. This results in a slave cylinder the annular piston of which rotates together with the corresponding transfer element by, for example, fixedly arranging the annular piston on one bearing ring of the actuating bearing or is formed from the bearing ring, while the other bearing ring receives the grooved ring seal. The bearing ring on the piston side may form or contain an annular part at which are arranged several individual pistons distributed over the circumference which are connected fixedly to the transfer element.

The seal of a slave cylinder constructed in this manner for forming the annular space may, in an advantageous manner, be provided by sealing the annular or disk part relative to the outer ring of the support bearing and at the inner circumference of the slave cylinder housing. The disk part has a number of openings corresponding to the number of individual pistons for permitting passage of the individual pistons, wherein the openings are sealed relative to the individual pistons.

For obtaining an axial gain of structural space, the actuating bearings may be constructed as needle bearings. Further sealing measures of such axial bearings are not required because they are completely received in the annular space. The support bearing may be a double now roller bearing. Alternatively, axial ball bearings may be provided for radially supporting the bearing ring which forms the seal to the radial shaft sealing ring mounted on the piston, so that the tolerances of the radial shaft sealing ring may be selected narrower.

The inventive concept also comprises an individual frictional clutch with an actuating system which is rotatable and axially fixed, wherein the actuating bearing arranged between the transfer element and the piston of the slave cylinder can be received in the same manner as one of the frictional clutches of the dual clutch and the support bearing for receiving the actuating system in an annular space, which may be formed, for example, by elastic diaphragms.

The invention is explained in more detail with the aid of FIGS. 1 to 7.

Figure 1:
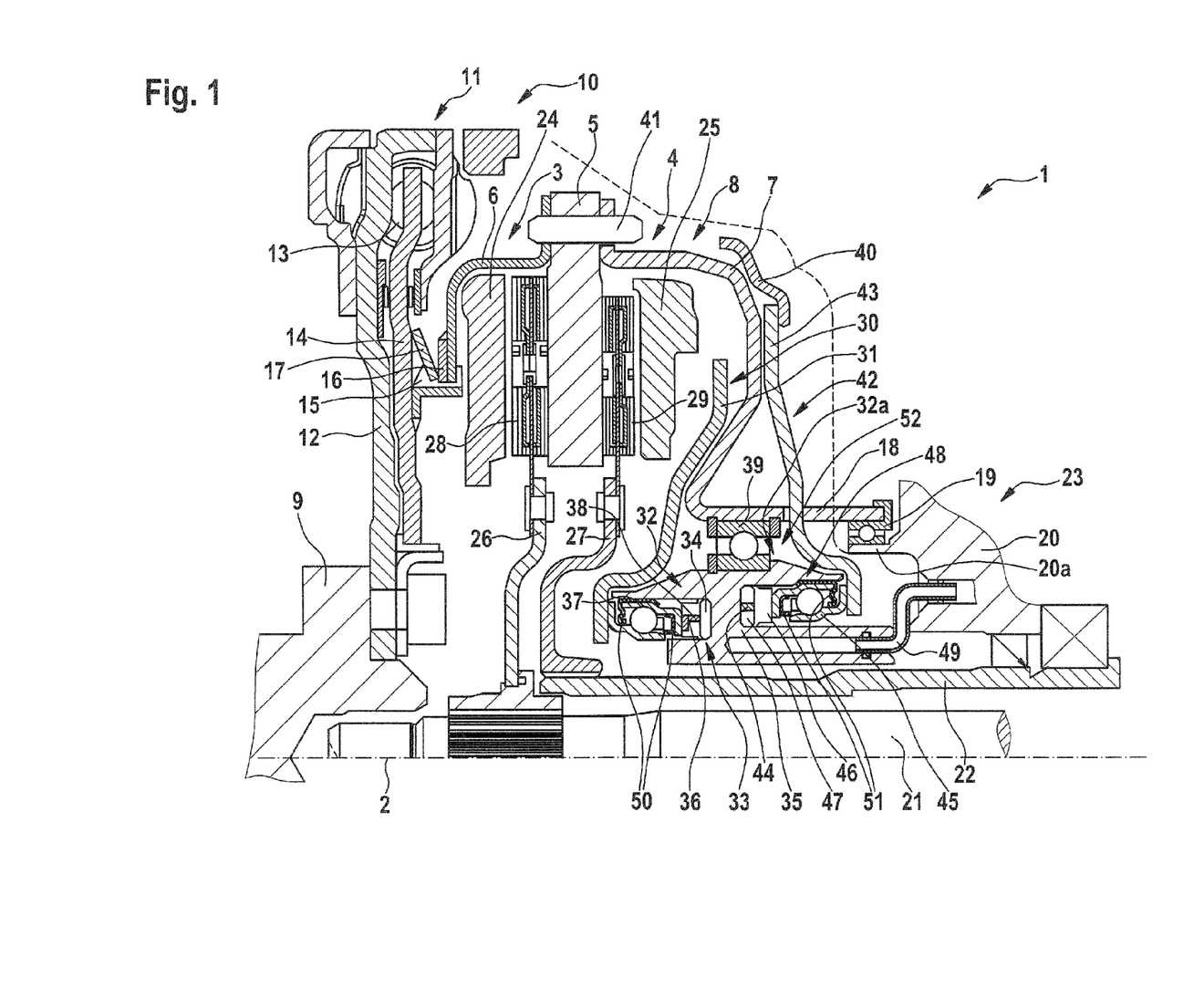
FIG. 1 is a partial sectional view of an embodiment of dual clutch.

FIG. 1 shows a dual clutch 1 in a partial sectional view above the axis of rotation 2 thereof. The dual clutch 1 contains two frictional clutches 3, 4 which have a common central contact pressure plate 5 which is fixedly connected to the housing parts 6, 7 of the clutch housing 8. The clutch housing 8 is driven by the crankshaft 9 of an internal combustion engine which is not illustrated in detail. For this purpose, in the illustrated embodiment, a torsional vibration damper 10—here in the form of a two-mass flywheel 11—is connected to an input part 12 with the crank shaft 9. The output part 14, which is rotatable to a limited extent against the action of the energy stores 13 with respect to the input part 12 has a protruding toothing profile 15 which is engaged by a complementary toothing profile 16, for example, as illustrated, an internal toothing of the housing part 6. The dual clutch 1 is braced against the crank shaft 9 and against the torsional vibration damper 10 by means of an axially acting energy storage unit 17, for example, a plate spring in the illustrated embodiment, relative to the output part 4 of the rotary vibration damper 10. In further embodiments, the tensioning relative to the drive side can be carried out in the same manner on other structural components, like the toothing of housing part 6.

The clutch housing 8 is supported against the action of the energy storage 17 on the gear unit side by means of an axial projection 18 of the housing part 7. The latter is rotatable and fixed axially by means of a fixed bearing 19 arranged on an axial projection 20*a* of the gear unit housing 20. As a result, the dual clutch 1 is received or supported on the drive side as well as on the gear unit side. Axial offsets between the crank shaft 9 and the gear unit input shafts 21, 22 of the gear unit 23, which may be a dual clutch gear unit, as well as axial and tumbling vibrations of the dual clutch 1 arising from combustion processes are compensated by the elasticity of the toothing between the toothing profiles 15, 16.

Radially within the clutch housing 8 are provided pressure plates 24, 25 for forming the frictional clutches 3, 4, wherein the pressure plates 24, 25 are non-rotatably connected to the clutch housing 8 by means of leaf springs (not illustrated), for example the housing parts 6, 7 and hold the pressure plates in the open position of the frictional clutches 3, 4. Between the contact pressure plate 5 and the pressure plates 24, 25 are provided a clutch disk 26, 27 with frictional linings 28, 29 for forming a frictional engagement of the frictional clutches 3, 4. The clutch disks 26, 27 are non-rotatably connected to the gear input shafts 21, 22, for example, through toothings.

The pressure plate 25 of the frictional clutch 4 is axially acted upon by a transfer element 30 in the form of a piston plate 31, illustrated, for forming a path-depending frictional engagement between the pressure plate 25 and the contact pressure plate 5 on the other hand with the frictional linings 29 of the clutch disk 27. The load application takes place by means of the actuating device 32 belonging to the actuating system 52 for both frictional clutches, wherein the actuating device is a slave cylinder 33 to which pressure is applied from the outside having a slave cylinder housing 35 which forms a pressure chamber 34, wherein in the slave cylinder housing 35 is received a annular piston 36 which is displaceable axially in dependence of the pressure present in the pressure chamber 34. Between annular piston 36 and piston plate 31 is received an actuating bearing 37, so that a decoupling of the rates of rotation between the fixed annular piston 36 and the rotating piston plate 31 is made possible.

The piston plate 31 is constructed stiff and transmits an axial path prescribed by the annular piston 36 to the pressure plate 25 with conforming amount and direction. Consequently, there is no ratio between pressure plate 25 and annular piston 36, so that the stroke of the annular piston 36 can be limited essentially and possibly with the consideration of the wear of the friction linings and the finishing tolerances to the stroke of the pressure plate 25 from the completely engaged state to the completely disengaged state of the frictional clutch 4. Consequently, the axial structural space of the slave cylinders 33 can be shortened. When the frictional clutch 3 is open, the transfer element 31 bears by means of a web 38 mounted against the piston 36 on the slave cylinder housing 35.

The slave cylinder housing 35 is axially fixedly and rotatably received by means of the support bearing 39, as illustrated on the inner circumference of the axial projection 18. By means of a torque support means, not illustrated, the slave cylinder housing 35 bears against the gear unit side and is fixed as a result. Due to the closed power cycle within the dual clutch 1 during an actuating process of the frictional clutch 25, the dual clutch 1 is independent of external influences and can therefore be disengaged especially precisely. For this purpose, the slave cylinder housing 35 rests on the clutch housing 8 via the support bearing 39, the annular piston 36 bears against the slave cylinder housing 35 and acts on the pressure plate 25 which is tensioned against the contact pressure plate 5 fastened to the clutch housing 8, so that the power cycle is very short.

The frictional clutch 3 is actuated in a similar manner and using the same advantages. For displacing the pressure plate 24, the pressure plate 24 is acted upon by tie rods 40 which are distributed over the circumference, and are arranged between the rivets 41 in the circumferential direction, wherein the tie rods 40 extend through corresponding housing openings, not illustrated, of the housing parts 6, 7 and engage over the pressure plate 24. Outside of the clutch housing 8, the tie rods 40 are axially acted upon by the also stiff transfer element 42 such as piston plate 43, which engages through openings of the axial projection 18. The piston plate 43 has openings, not illustrated in detail, which engage through openings of the axial projections. The actuating bearing 45 acts on the inner circumference of the piston plate 43, and is acted upon by the annular piston 46, which is guided so as to be axially displaceable in the pressure chamber 47 of the slave cylinder 48. When the clutch 4 is open, the transfer element 42 bears axially against the slave cylinder housing 35 by means of the web 44 attached to the piston 46.

The two slave cylinders 33, 48 are arranged in a single annular-shaped slave cylinder housing 35, wherein the annular pistons 36, 46 are arranged axially on the oppositely located sides of the slave cylinder housing 35. The pressure supply for the pressure chambers 34, 47 takes place by means of pressure lines, which are distributed over the circumference and are guided between the gear unit housing 20 and the slave cylinder housing 35, wherein, in the illustrated sectional view, only one pressure line 49 is visible. The pressure chambers are controlled and supplied with pressure through the pressure lines. A pressure transmitted by means of a pressure medium to the pressure chambers 34, 47 can be made available by means of a master cylinder or by means of a pump, wherein, if a pump is used, appropriate control valves control the pressure to be transmitted to the slave cylinders 33, 48.

Due to the actuation of the pressure plate 24, 25 without transmission ratio, the forces acting on the actuating bearing 37, 45 and on the support bearing 39 are correspondingly high. Especially the actuating bearings are therefore dimensioned for handling high forces and high operating temperatures due to the internal friction of the bearings. In particular, the actuating bearings are filled with a special grease and are protected by means of the sealing disks 50, 51 against a discharge of the grease.

Figure 2:
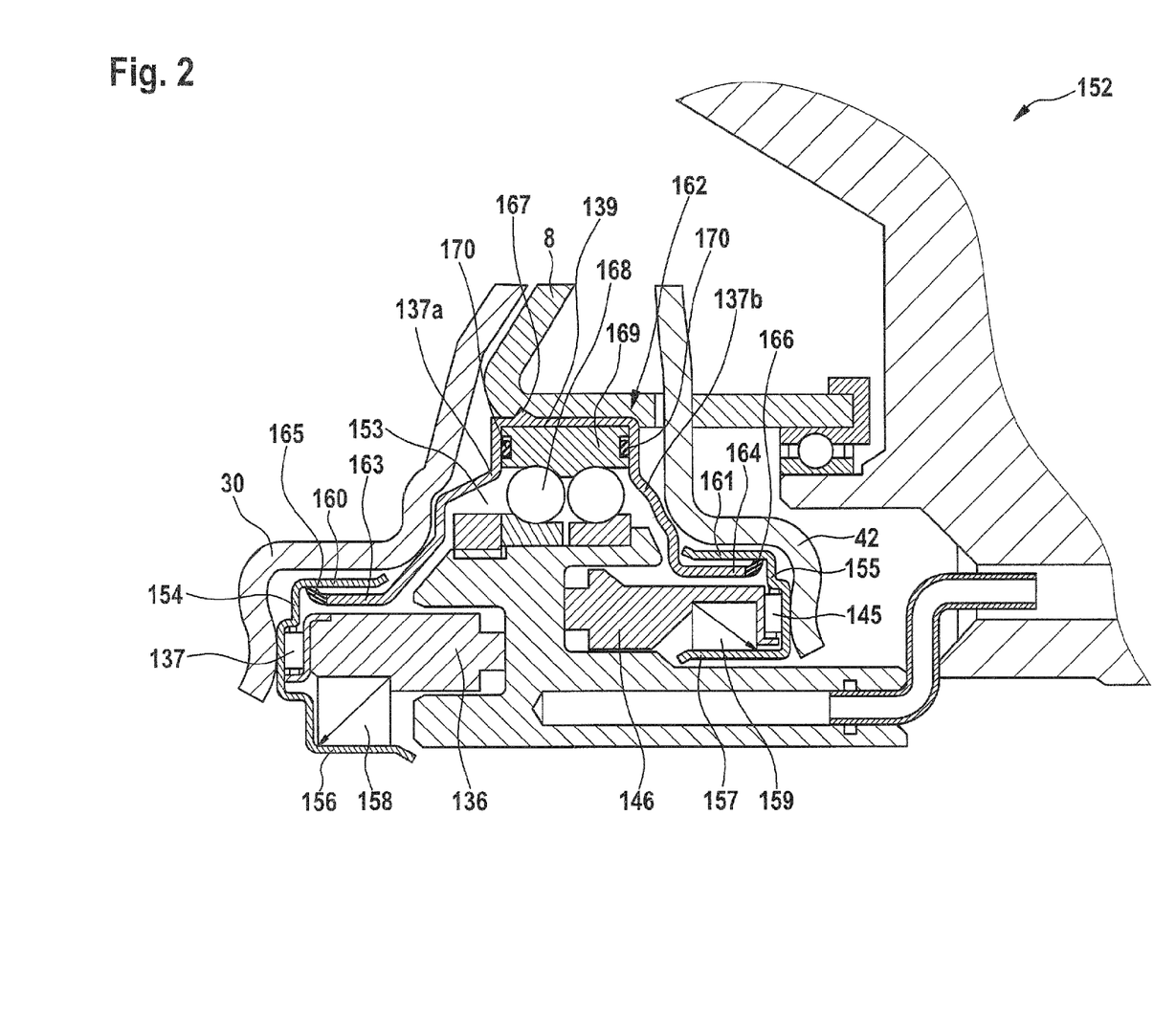
FIG. 2 is an actuating system, modified compared to the actuating system of FIG. 1, with actuating bearings encapsulated in an annular space.

FIG. 2 shows an actuating system 152 which is modified as compared to the actuating system 52 of FIG. 1. The annular space 153 accommodates the actuating bearing 137, 145 as well as the support bearing 139. For forming and sealing the annular space 153 toward the outside, a radial shaft-sealing ring 158, 159 is arranged each on the annular pistons 136, 146 so as to seal relative to the bearing rings 154, 155. For this purpose, the bearing rings 154, 155 are angled at their inner circumference and each forms an axial projection 156, 157. The bearing rings 154, 155 are arranged axially fixed relative to the annular pistons 136, 146, so that the radial shaft rings 158, 159 merely have to compensate a relative rotation against the annular piston 136, 146 relative to the bearing rings 145, 155.

The transverse movement of the stationary clutch housing 8 relative to the transfer elements 30, 42, on which the bearing rings 154, 155 are fixedly arranged, takes place between the bearing rings 154, 155 and by means of side parts 137*a*, 137*b* formed at the outer ring 162 of the support bearing 139 axially fixedly received on the clutch housing 8. For this purpose, the side parts 137a, 137b each have at their outer circumference another axial projection 160, 161 which projections axially extend correspondingly over projections 163, 164 arranged on the side parts 137a, 137b coaxially thereto. The projections 160, 163 or 161, 164 are sealed relative to each other by means of a sealing lip 165, 166, wherein, in the illustrated embodiment, the sealing lips 165, 166, which may be integrally injection molded to the projections 163, 164, are attached to the projections assigned to the outer ring 162 and seal on sealing surfaces of the projections 160, assigned to the bearing rings 145, 155. Due to the same number of rotation of the projections 160, 161 162, 163, merely a non-rotating, transverse seal between the projections 160, 163 or 161, 164 is to be provided.

The outer ring 139 can directly form the outer raceway for the rolling bodies. However, in the illustrated embodiment, a bearing ring 169 forming the raceways for rolling bodies 168 arranged in two rows is arranged between the outer ring 139 and the rolling bodies 168, so that it is possible to provide a nose 167 radially outwardly projecting from the outer ring 139, wherein the support bearing can be axially fixed by means of the nose 167. Bearing ring 169 and outer ring 139 are sealed relative to each other by means of the sealing rings 170.

Figure 3:
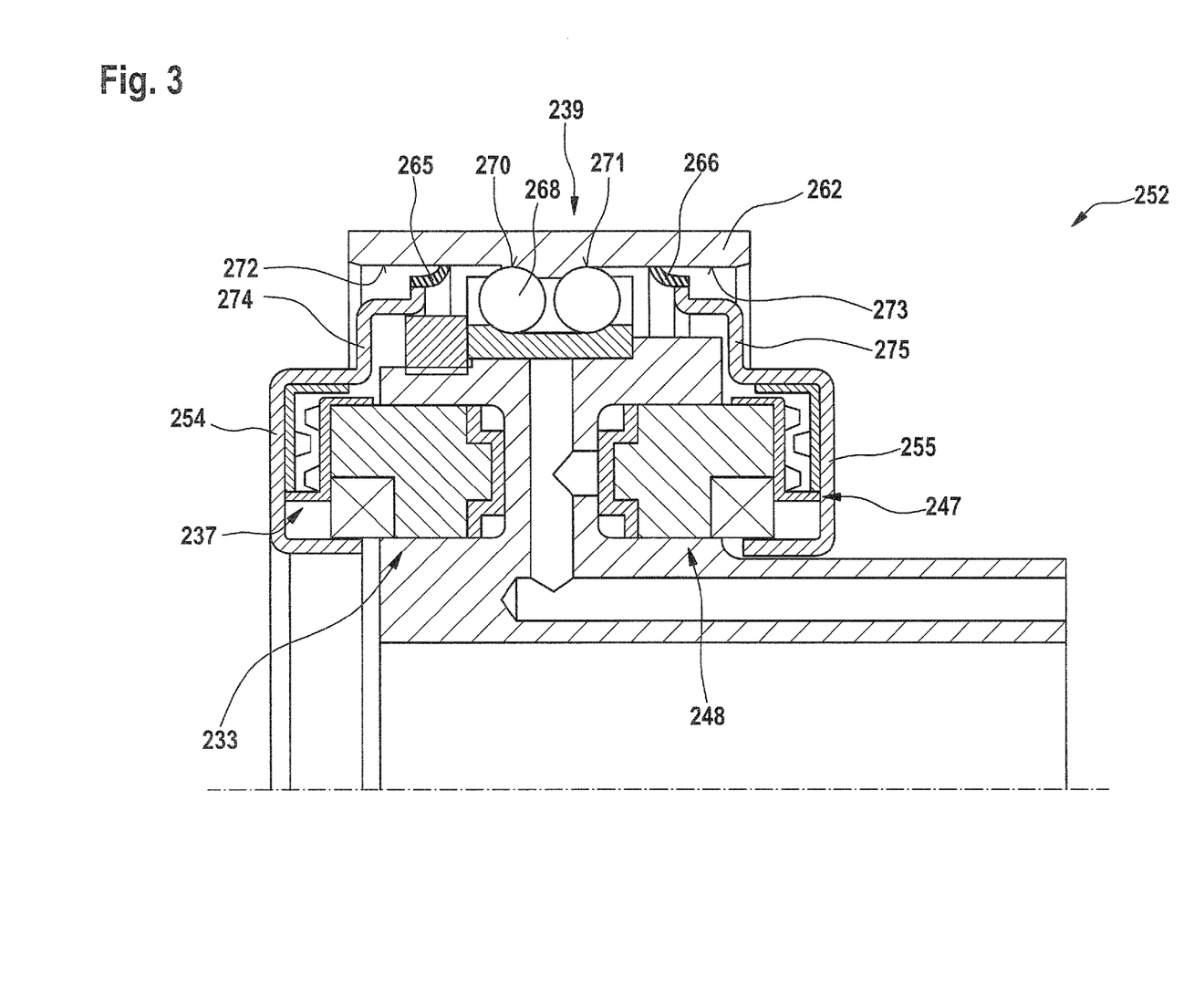
FIG. 3 shows a modification of the actuating system of FIG. 2.

FIG. 3 shows in contrast to the actuating system 152 of FIG. 2 a modified actuating system 252 in which the outer ring 262 of the support bearing 239 is essentially constructed hollow cylindrically and already provides the raceways 270, 271 for the rolling bodies 268 arranged in two rows. Moreover, sealing surfaces 272, 273, which can be produced simultaneously with the manufacture and processing of the raceways 270, 271, are provided on the inner circumference, on which sealing surfaces sealing lips 265, 266 axially displaceably seal, depending on the actuating movements of the slave cylinders, the sealing lips 265, 266 being fastened to the radially widened side parts 274, 275 of the bearing rings 254, 255 of the actuating bearing 237, 247. The sealing lips 265, 266 can be integrally injection molded or can be replaced by annular seals such as O-rings or seals with square-shaped or V-shaped cross section.

Figure 4:
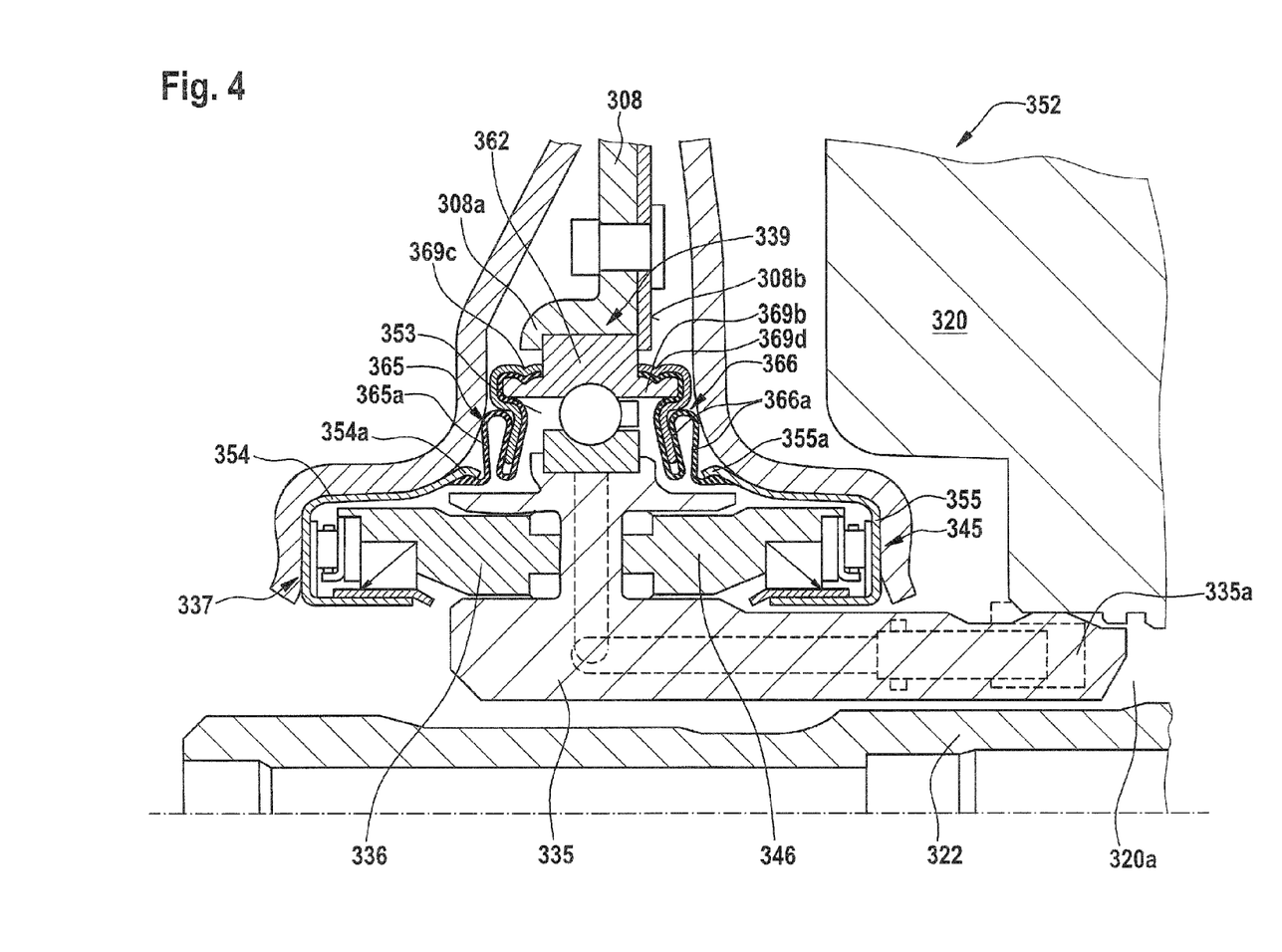
FIG. 4 shows an actuating system with an annular space sealed by means of elastic diaphragms.

FIG. 4 shows an actuating system 352 with a modified mounting of the actuating bearing 337 at the clutch housing 308. The actuating bearing 337 is placed from the gear unit side against a stop 308a of the clutch housing 308 and is secured by means of a disk part 308b which is riveted thereto. The dual clutch is received at the gear unit housing 320 by means of an axial projection 335a of the slave cylinder housing 335 at an annular gap 320a between the outer gear unit input shaft 322 constructed as a hollow shaft and the gear unit housing 320.

The seal of the annular space 353 between the outer ring 362 of the support bearing 339 and the bearing rings 354, 355 of the actuating bearings 337, 345 is effected in this embodiment by means of bellows 355, 366, arranged between the bearing rings 354 or 355, respectively, and the outer ring 362. As shown in the embodiment, the bellows 365, 366 can be received preferably tensioned at axial projections 369a, 369b of the outer ring 362, wherein the projections 369a, 369b may have corresponding radial recesses 369c, 369d. The other ends of the bellows 365, 366 are received at a projection of the bearing rings 354, 355 which are axially displaced with a stroke of the annular pistons 336, 346. In a particularly advantageous manner, one intermediate part 354a, 355a each is provided between the bearing rings 354, 362 or 355, 362 which intermediate part provides a guide for the bellows 355, 366, particularly for stabilizing under the effect of centrifugal force. The stroke between the bearing rings 354, 355 and the stationary outer ring 362 is compensated by the folds 365a, 366a. The ends of the bellows 365, 366 can be secured on the corresponding receiving means by means of clamps or clamping rings, particularly for obtaining a stable connection under the influence of centrifugal force. As an alternative, the bellows can be vulcanized at least on one side onto the metal receiving means or the intermediate parts 354a, 355a.

Figure 5:
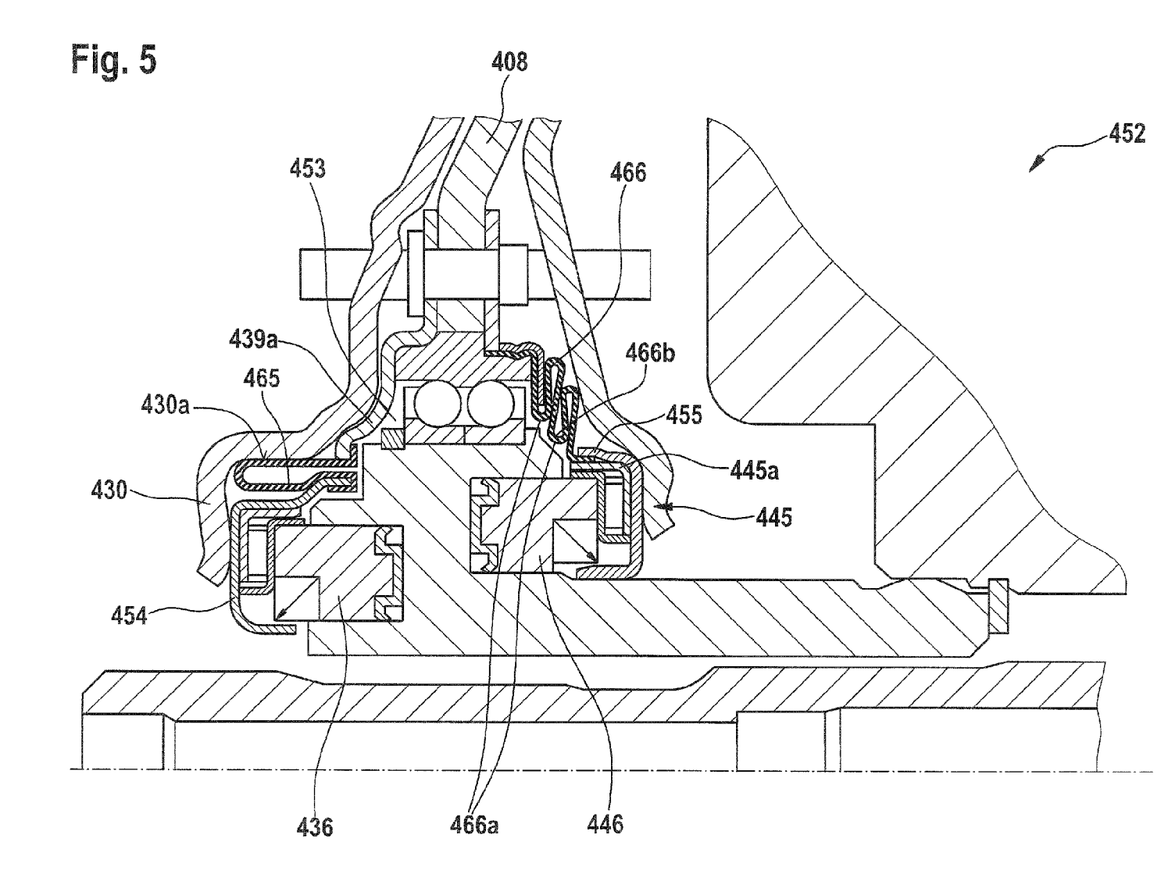
FIGS. 5 and 6 show actuating systems which are modified as compared to the embodiment of FIG. 4, with modified elastic diaphragms.

FIG. 5 shows an actuating system 452 which is similar to the actuating system 352 of FIG. 4 with a bellows 466 having two folds 466a which exhibit a smaller radial change during the stroke of the annular piston 446. The connection of the bellows 466 to the outer ring 455 is effected by means of a press connection of the end of the bellows between the outer ring 455 and the structural component 445a belonging to the actuating bearing 445 and arranged radially within the bearing ring 455.

A ring 466b may be arranged at least in one fold 466a for stabilizing the fold. Alternatively, the wall thickness of the bellows may be provided.

The translatory seal of the ring space 453 on the side of the actuating system 452 facing the drive unit takes place by means of a rolling diaphragm 465 or rolling bellows. The bellows rest on an inner circumference 430a of the transfer element 430 against centrifugal force. When the annular piston 436 is displaced, the elastic rolling diaphragm 465 rolls off on the inner circumference. The rolling diaphragm 465 is received at one end at the side part 439a which is received at the clutch housing 408 and is sealingly tight arranged relative to the bearing ring 454, for example, by vulcanization. The other end engages over the end phase of the bearing ring 454.

Figure 6:
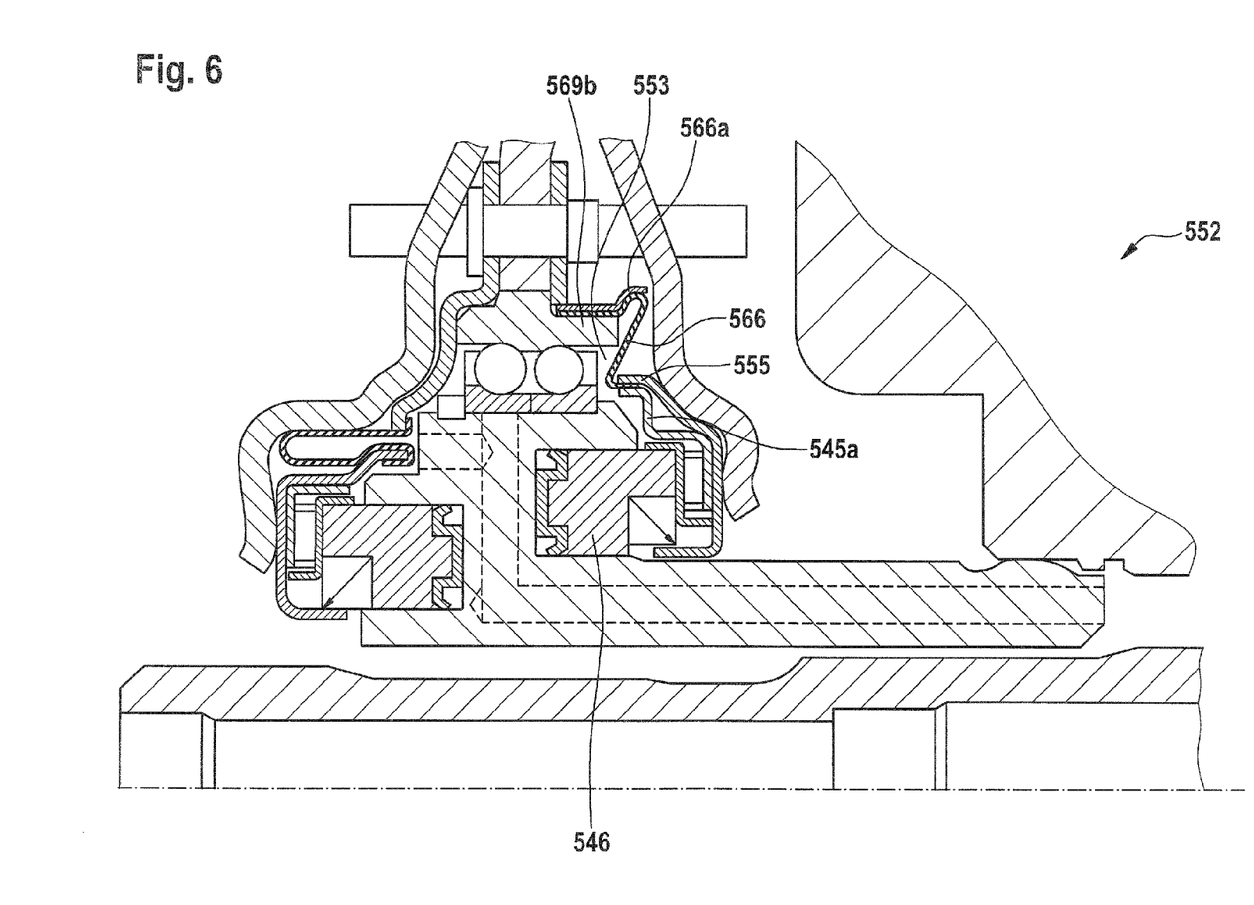

FIG. 6 shows an actuating system 552 which is changed as compare to FIG. 5 with a changed seal of the annular space 553. Instead of the bellows 466 used there, a pendulum-type bellows 566 is used. The pendulum-type bellows 566 is braced at its outer diameter to the projection 569b by means of a metal band 566a. During a displacement of the annular piston 546, the outer circumference of the pendulum-type bellows 566 is displaced relative to the inner circumference. The pendulum-type bellows 566 swings about its radially outer brace. The pendulum-type bellows is advantageously positioned in such a way that when half a stroke of the annular piston 546 has been carried out, the wall of the pendulum-type bellows 566 located between the ends of the brace extends perpendicularly. In this manner, a displacement of the annular piston 546 can take place without elastic elongation of the pendulum-type bellows 566. The inner circumference of the pendulum-type bellows 566 is braced between the bearing ring 555 and the radially inwardly arranged structural component 545a, wherein the end of the structural component 545a may be made thickened. As an alternative to the pendulum-type bellows 566, a flat diaphragm may be provided which compensates for the axial compensation of the stroke of the annular piston 546 caused by an adjusted elastic elongation capacity.

Figure 7:
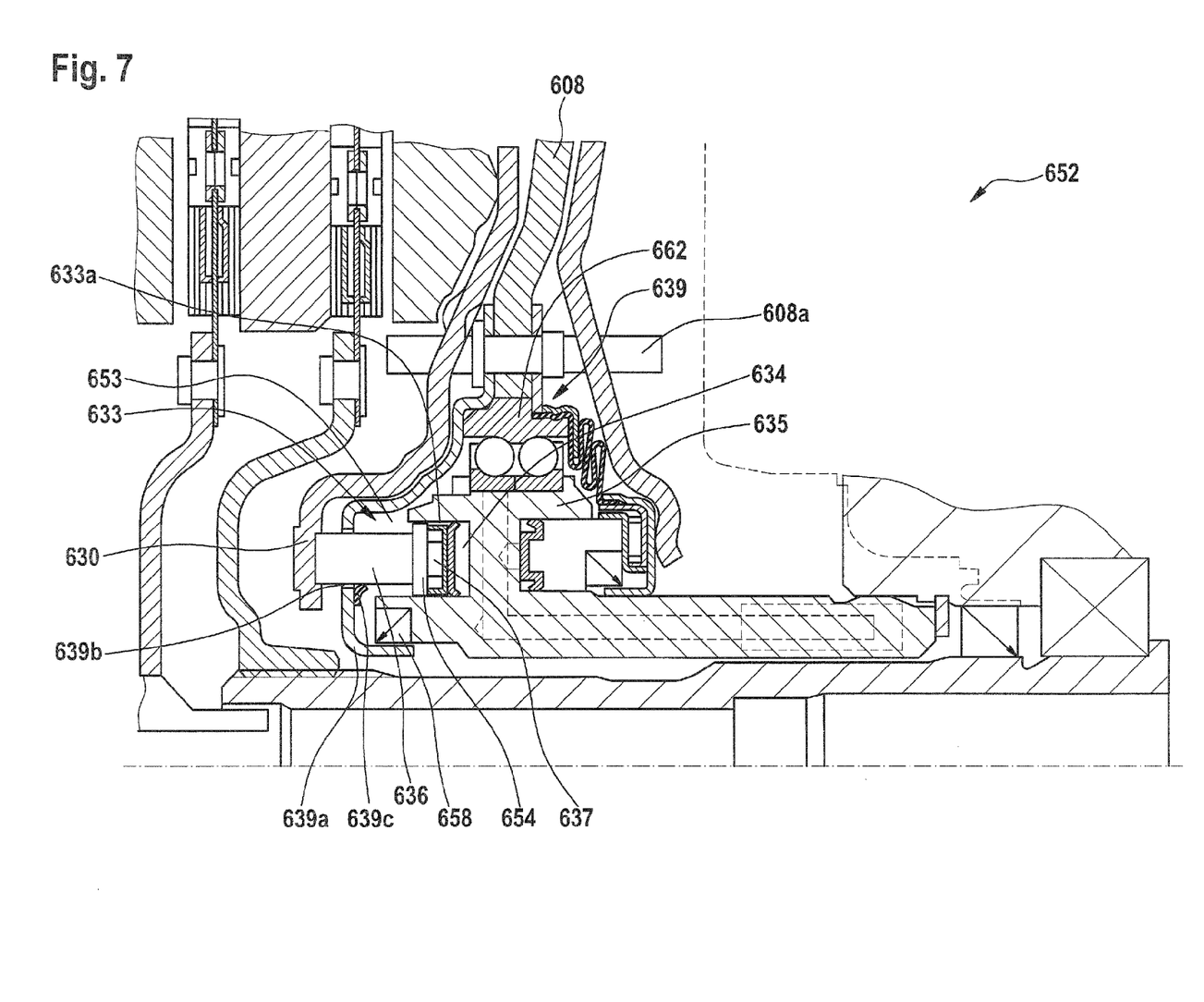
FIG. 7 shows an embodiment of an actuating system with a slave cylinder with rotating annular piston.

FIG. 7 shows an actuating system 652 with a slave cylinder 633 changed with respect to the slave cylinder 33 of FIG. 1. In the slave cylinder 633, the actuating bearing 637 is received in the annular opening 633a of the slave cylinder 633, wherein one bearing ring receives the groove ring seal for sealing the pressure chamber 634. The other bearing ring 654 receives an annular part or forms this annular part on which are arranged individual pistons 636 arranged fixedly connected to the transfer elements 630, wherein the bearing ring 654 forms the rotating part of the actuating bearing 637.

The sealing of the annular space 653 is effected by means of the sheet metal part 639a which is riveted at the outer circumference to the clutch housing 608 and is radially sealed inwardly relative to the outer ring 662 of the support bearing 639. At the inner circumference, the sheet metal part 639*a* is angled and forms a sealing contact to the radial shaft sealing ring 658 arranged at the slave cylinder housing 635. Between the inner and outer circumference of the sheet metal part 639*a*, openings 639*b* are provided through which the individual pistons 636 are guided. Each of the openings 639*b* is provided with a seal 639*c* which seals the individual piston 636.

The use of simple seals 639*c* is advantageous. The side part 639*a* rotates together with the clutch housing 608 and seals the annular space 653 relative to the slave cylinder housing, so that the groove ring seal of the slave cylinder 633 is completely received in the annular space 653. Due to the mounting of the side part 639*a* and of the clutch housing 635 centered at the support bearing 639 at the same riveting 608*a*, a smaller deviation of the coaxial arrangement of the two parts relative to each other is achieved, so that the radial shaft sealing ring 658 is treated gently in an advantageous manner.

LIST OF REFERENCE NUMERALS 1 dual clutch
2 axis of rotation
3 frictional clutch
4 frictional clutch
5 contact pressure plate
6 housing part
7 housing part
8 clutch housing
9 crank shaft
10 torsional vibration damper
11 two-mass flywheel
12 input part
13 energy storage
14 output part
15 toothed profile
16 toothed profile
17 energy storage
18 axial projection
19 fixed bearing
20 gear unit housing
20*a* projection
21 gear unit input shaft
22 gear unit input shaft
23 gear unit
24 pressure plate
25 pressure plate
26 clutch disk
27 clutch disk
28 frictional lining
29 frictional lining
30 transfer element
31 piston plate
32 actuating device
32*a* actuating device
33 slave cylinder
34 pressure chamber
35 slave cylinder housing
36 annular piston
37 actuation bearing
38 web
39 support bearing
40 tie rod
41 rivet
42 transfer element
43 piston plate
44 web
45 actuating bearing
46 annular piston
47 pressure chamber
48 slave cylinder
49 pressure line
50 sealing disk
51 sealing disk
52 actuating system
136 annular piston
137 actuating bearing
137*a* side part
137*b* side part
139 support bearing
145 actuating bearing
146 annular piston
152 actuating system
153 ring space
154 bearing ring
155 bearing ring
156 projection
157 projection
158 radial shaft sealing ring
159 radial shaft sealing ring
160 projection
161 projection
162 outer ring
163 projection
164 projection
165 sealing lip
166 sealing lip
167 nose
168 rolling body
169 bearing ring
170 seal
233 slave cylinder
237 actuating bearing
247 actuating bearing
248 slave cylinder
252 actuating system
254 bearing ring
255 bearing ring
262 outer ring
268 rolling body
270 raceway
271 raceway
272 sealing surface
273 sealing surface
274 side part
275 side part
308 clutch housing
308*a* stop
308*b* disk part
320 gear unit housing
320*a* annular gap
335 slave cylinder housing
337 actuating bearing
335*a* projection
339 support bearing
345 actuating bearing
352 actuating system
353 annular space
354 bearing ring
354*a* intermediate part
355 bearing ring
355*a* intermediate part 362 outer ring
365 bellows
365a fold
366 bellows
366a fold
369a projection
369b projection
369c recess
369d recess
408 clutch housing
430 transfer element
430a inner circumference
436 annular piston
439a side part
445 actuating bearing
445 structural component
446 annular piston
452 actuating system
453 annular space
454 bearing ring
455 bearing ring
465 rolling diaphragm
466 bellows
466a fold
466b fold
545a structural component
546 annular piston
552 actuating system
553 annular space
555 bearing ring
566 pendulum-type bellows
566a metal band
569b projection
608 clutch housing
608a rivet
630 transfer element
633 slave cylinder
633a annular opening
634 pressure chamber
635 slave cylinder housing
636 individual piston
637 actuating bearing
639 support bearing
639a metal part
639b opening
639c seal
652 actuating system
653 annular space
654 bearing ring
658 radial shaft sealing ring
662 outer ring

The invention claimed is:

1. A dual clutch, comprising:
two frictional clutches driven by a drive unit having a common clutch housing and a contact pressure plate fixedly connected to the clutch housing with two contact pressure surfaces and two axially displaceable pressure plates each facing one of the contact pressure surfaces,
wherein between each of the axially displaceable pressure plates and the contact pressure plate are respective frictional linings of clutch disks, which are respectively non-rotatingly connected to two gear unit input shafts of a gear unit, for forming a frictional engagement by axially acting on the axially displaceable pressure plates by means of an actuating system held axially fixedly and, by means of support bearing, rotatably on the clutch housing, the axially displaceable pressure plates can be tensioned with respective actuating devices, wherein the axially displaceable pressure plates are actuated by transfer elements acted upon by the actuating devices,
wherein the axially displaceable pressure plates are displaced along an axial path that conforms in amount to an actuating path adjusted at the actuating devices, and
wherein a sealed annular space is formed between the clutch housing and an outer circumference of the actuating devices.

2. The dual clutch according to claim 1, wherein both of the actuating devices are arranged around the two gear unit input shafts by means of a common receiving means.

3. The dual clutch according to claim 2, wherein the receiving means is rotatably received on the clutch housing and is non-rotatingly supported on a gear unit housing of the gear unit.

4. The dual clutch according to claim 1, wherein the clutch housing is rotatably supported on a gear unit housing.

5. The dual clutch according to claim 4, wherein the clutch housing is axially fixed on an extension axially projecting from the gear unit housing by means of a fixed bearing and held rotatably relative to the gear unit housing.

6. The dual clutch according to claim 1, wherein the clutch housing faces the gear unit and has an axial projection at which the receiving means is mounted and by means of which the dual clutch is rotatably supported on the gear unit housing.

7. The dual clutch according to claim 1, wherein at least one of the frictional clutches is a forcibly dosed frictional clutch.

8. The dual clutch according to claim 1, wherein both frictional clutches are forcibly closed frictional clutches, wherein the actuating paths for the closing of which are directed opposite each other.

9. The dual clutch according to claim 1, wherein actuating devices are operated hydrostatically.

10. The dual clutch according to claim 9, wherein the common receiving means of the actuating devices is a slave cylinder housing which accommodates slave cylinders, each of the slave cylinders acting on a respective transfer element.

11. The dual clutch according to claim 10, wherein the slave cylinders have respective annular pistons to which pressure can be applied and the pistons actuate the transmission elements with an intermediate arrangement of an actuating bearing.

12. The dual clutch according to claim 11, wherein rolling surfaces of the actuating bearings and the support bearing are arranged within the annular space.

13. The dual clutch according to claim 11, wherein the annular space between the clutch housing and inner circumferences of the annular pistons are sealed by means of radial shaft sealing ring.

14. The dual clutch according to claim 13, wherein the annular space is sealed relative to the clutch housing at an outer ring of the support bearing.

15. The dual clutch according to claim 13, wherein bearing rings of the actuating bearings are sealed relative to the annular pistons by means of a radial shaft sealing ring.

16. The dual clutch according to claim 15, wherein bearing rings of the actuating bearings are sealed relative to an outer ring of the support bearing by means of a translatory seal.

17. The dual clutch according to claim 16, wherein at the bearing rings of the actuating bearings is each formed an axial annular flange formed coaxially relative to an annular flange of the outer ring of the support bearing, whereby the translatory seal is effective between the annular flanges of one bearing ring each of an actuating bearing and one of the annular flanges each of the outer ring of the support bearing.

18. The dual clutch according to claim 17, wherein the annular flanges are arranged radially within the rolling bodies of the support bearing.

19. The dual clutch according to claim 16, wherein the translatory seal is formed of a sealing lip which is fixedly connected at the annular flange and which seals relative to a sealing surface at the corresponding annular flange.

20. The dual clutch according to claim 15, wherein the bearing rings of the actuating bearing form radially outwardly of the rolling bodies of the support bearing the translatory seal relative to the outer ring of the support bearing.

21. The dual clutch according to claim 20, wherein a sealing lip is arranged at the outer circumference of the bearing rings which seals at an inner circumference of the outer ring.

22. The dual clutch according to claim 15, wherein between the clutch housing or the outer ring of the support bearing and the bearing rings of the actuating bearings an elastic diaphragm each is arranged.

23. The dual clutch according to claim 22, wherein the elastic diaphragm is a fold bellows, a rolling diaphragm or a pendulum-type bellows.

24. The dual clutch according to claim 22, wherein one elastic diaphragm each is held at an outer circumference of the support bearing and at an inner circumference of the outer ring of the respective actuating bearing.

25. The dual clutch according to claim 22, wherein the elastic diaphragm has at least one recess engaging around a bearing ring.

26. The dual clutch according to claim 22, wherein the elastic diaphragm is tensioned between at least one bearing ring and another structural component of the actuating or support bearing.

27. The dual clutch according to claim 10, wherein at least one of the slave cylinders has an annular piston rotating with the clutch housing, wherein the actuating bearing is arranged between a lip seal toward the pressure chamber of the receiving cylinder and the annular piston.

28. The dual clutch according to claim 27, wherein the annular piston is formed from a bearing ring of the actuating bearing and has several individual pistons distributed over the circumference which are rigidly connected to the transfer element.

29. The dual clutch according to claim 27, wherein the slave cylinder comprises for forming the annular space has a sheet metal part fastened to the clutch housing and sealed relative to the outer ring of the support bearing and sealed at the inner circumference of the slave cylinder housing, wherein the sheet metal part has a number of openings corresponding to a number of individual pistons for permitting passage of the individual pistons, wherein the openings are sealed relative to the individual pistons.

30. The twin clutches according to claim 11, wherein the actuating bearings are constructed as needle bearings or axial wall bearings.

31. The dual clutch according to claim 1, wherein the annular space is at least partially filled with a fluid.

32. The dual clutch according to claim 31, wherein the fluid has lubricating and/or cooling properties.

33. The twin clutch according to claim 1, wherein the support bearing is a double row roller bearing.

34. Frictional clutches, comprising:

a clutch housing driven by a drive and a contact pressure plate rigidly connected to the clutch housing, wherein the contact pressure plate has a contact pressure surface and a pressure plate which is axially displaceable and faces the contact pressure surface, wherein, between the pressure plate and the contact pressure plate, frictional linings of a clutch disk rigidly connected to a gear unit input shaft of a gear unit for forming a frictional engagement by axially loading of the pressure plate by means of an actuating system with an actuating device which is received axially rigidly and rotatable by means of a support bearing at the clutch housing, wherein the pressure plate is actuated by a transfer element loaded by the actuating device, and the pressure plate is displaced by an actuating distance that conforms to an actuating distance adjusted at the actuating device, and wherein a sealed annular space is formed between the clutch housing and an outer circumference of the actuating device.

* * * * *